(12) United States Patent
Luo et al.

(10) Patent No.: US 7,903,432 B2
(45) Date of Patent: Mar. 8, 2011

(54) HIGH-VOLTAGE POWER GENERATION SYSTEM AND PACKAGE

(75) Inventors: Jing Luo, London (GB); Saijun Mao, Shanghai (CN); Yunfeng Liu, Shanghai (CN); Denis Perrillat-Amede, Paris (FR); Philippe Ernest, Gif sur Yvette (FR); Xiaoming Yuan, Rexford, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/474,569

(22) Filed: May 29, 2009

(65) Prior Publication Data
US 2010/0301985 A1    Dec. 2, 2010

(51) Int. Cl.
*H01F 5/00* (2006.01)
*H02M 7/00* (2006.01)

(52) U.S. Cl. .............. 363/13; 336/200; 336/223

(58) Field of Classification Search ............ 363/13, 363/59–61; 361/225–228, 329; 378/91, 378/101
See application file for complete search history.

(56) References Cited

U.S. PATENT DOCUMENTS

| | | | | |
|---|---|---|---|---|
| 3,732,945 A | * | 5/1973 | Lavigne | 367/189 |
| 4,443,843 A | | 4/1984 | Ikeda et al. | |
| 4,545,005 A | | 10/1985 | Mudde | |
| 4,720,844 A | * | 1/1988 | Bougle | 378/101 |
| 4,977,491 A | | 12/1990 | Domenget et al. | |
| 4,995,069 A | * | 2/1991 | Tanaka | 378/200 |
| 5,023,768 A | | 6/1991 | Collier | |
| 5,166,965 A | | 11/1992 | Collier | |
| 5,225,803 A | | 7/1993 | Negle et al. | |
| 5,631,815 A | | 5/1997 | Cross et al. | |
| 5,835,367 A | | 11/1998 | Pan et al. | |
| 6,060,976 A | * | 5/2000 | Yamaguchi et al. | 336/200 |
| 7,180,397 B1 | * | 2/2007 | Busletta et al. | 336/200 |

FOREIGN PATENT DOCUMENTS

EP    0416708    3/1991
* cited by examiner

*Primary Examiner* — Anh T Mai
(74) *Attorney, Agent, or Firm* — Jason K. Klindtworth

(57) ABSTRACT

A power generation system comprises a power source, a transformer module for converting a low voltage from the power source into a higher voltage, and a voltage-multiplier module for amplifying higher voltage from the transformer module. The transformer module comprises a number N of transformer units. Each transformer unit comprises at least one transformer, and each transformer comprises a magnetic core, a primary winding, and a secondary winding. Primary windings of the transformers in the transformer module are electrically coupled in parallel to the power source, secondary windings of the transformers of each transformer unit comprise a pair of output terminal, and N is equal to or greater than two. The voltage-multiplier module comprises the number N of multipliers. Each multiplier module comprises a positive and a negative input terminal, and a positive and a negative output terminal. Positive and negative terminals of each multiplier are electrically coupled to the positive and negative output terminals of a corresponding transformer unit, and positive and negative output terminals of the multipliers are connected in series.

18 Claims, 6 Drawing Sheets

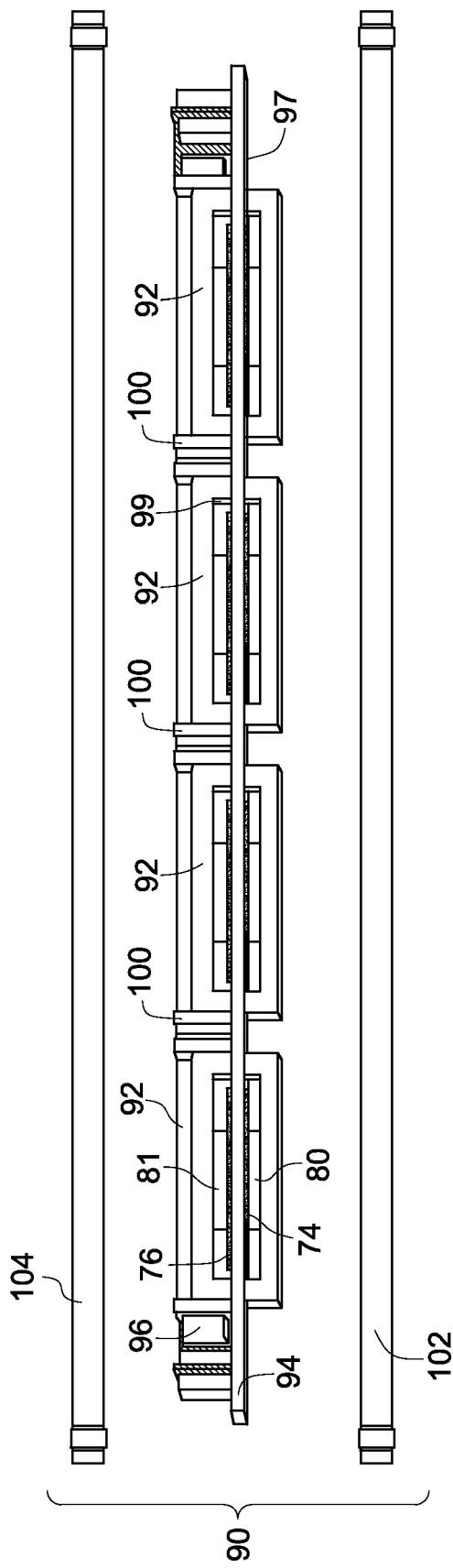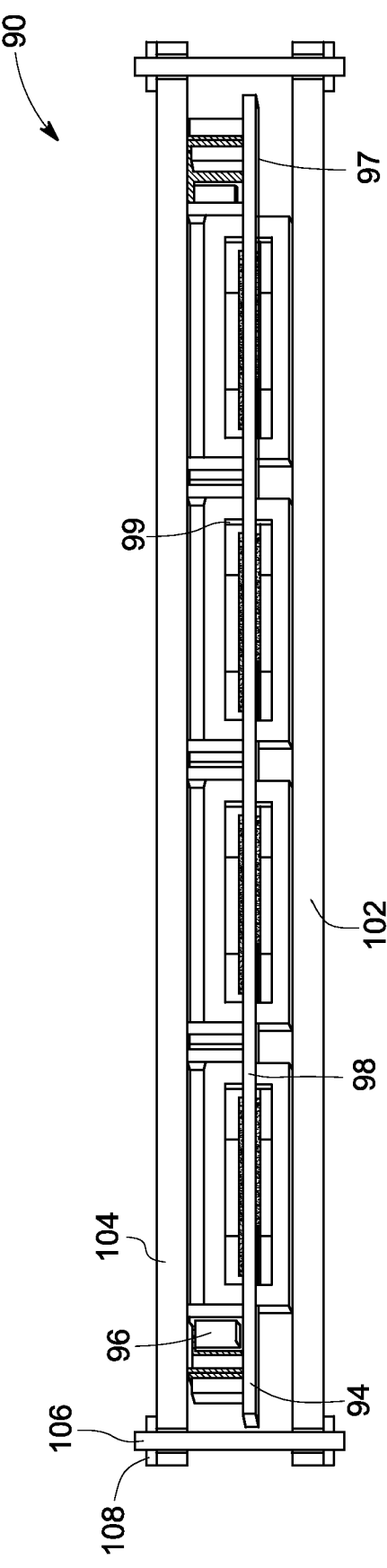
FIG. 5
FIG. 6

HIGH-VOLTAGE POWER GENERATION SYSTEM AND PACKAGE

BACKGROUND

Embodiments of the invention are generally related to the field of power generation systems, and more particularly, to a high-voltage power generation system used for, for example, X-ray generation. Embodiments of the invention are related to power generation packages carrying high-voltage power generation systems.

High-voltage power generation systems are used for, for example, supplying regulated high-voltage direct current (DC) to a vacuum tube, which push electrons to flow from a cathode to an anode and generate X-ray emission. The power generation system typically includes a transformer unit which has a high secondary-to-primary turns ratio and converts a relatively low-voltage alternating current (AC) to a relative high-frequency and high-voltage AC. The power generation system may further include a voltage doubler or voltage multiplier module which utilizes a plurality of capacitors and diodes to further boost the high-voltage AC from the secondary windings of the transformer module, as well as to convert the high-voltage AC into the targeted high-voltage DC.

One type of high-voltage power generation systems relies mostly on the transformer module to regulate the high-voltage DC, and accordingly includes a very high secondary-to-primary turns ratio. Problems associated with this type of high-voltage power generation systems include that the high secondary-to-primary turns ratio causes large parasitic impedances and a high AC stress in the secondary windings, which causes a very high insulation requirement and a very bulky packaging.

Another type of high-voltage power generation system relies mostly on the multiplier module to regulate the high voltage, and comprises a relatively low-voltage transformer and a multiplier module with a high magnification factor. This type of high-voltage power generation system is advantageous in that it has a low secondary-to-primary turns ratio in the transformer module. However, in order to achieve a high-voltage DC output, the series capacitors in the multiplier module must have large capacities, which in turn results in a high cost. Further, the large capacitors store a large amount of energy leading to a slow response time.

It is desirable to have an improved high-voltage power generation system with reduced AC stress in the secondary windings of the transformers.

BRIEF DESCRIPTION

In accordance with an embodiment disclosed herein, a power generation system comprises a power source, a transformer module for converting a low voltage from the power source into a higher voltage, and a voltage-multiplier module for amplifying higher voltage from the transformer module. The transformer module comprises a number N of transformer units. Each transformer unit comprises at least one transformer, and each transformer comprises a magnetic core, a primary winding, and a secondary winding. Primary windings of the transformers in the transformer module are electrically coupled in parallel to the power source, secondary windings of the transformers of each transformer unit comprise a pair of output terminal, and N is equal to or greater than two. The voltage-multiplier module comprises the number N of multipliers, each multiplier module comprises a positive and a negative input terminal, and a positive and a negative output terminal. Positive and negative terminals of each multiplier are electrically coupled to the positive and negative output terminals of a corresponding transformer unit, and positive and negative output terminals of the multipliers are connected in series.

In accordance with another embodiment disclosed herein, a power generation package comprises at least two transformer packages, an insulation planar board, and a printed circuit board. The insulation planar board comprises bottom and top surfaces. Each transformer package comprises a magnetic core comprising a lower core part and an upper core part respectively attached to the bottom and top surfaces of the insulation planar board, and a primary winding wound on the lower core part and a secondary winding wound on the upper core part. The printed circuit board carrying a plurality of electronic elements electrically coupled to the secondary windings of the at least two transformer packages.

In accordance with still another embodiment disclosed herein, an X-ray generation system comprises a power source providing a low-voltage alternating current, a transformer module for converting a low voltage from the power source into a higher voltage, a voltage-multiplier module for amplifying higher voltage from the transformer module, and a X-ray tube having an anode and a cathode respectively electrically coupled to the positive and negative output terminals of the voltage-multiplier module. The transformer module comprises a number N of transformer units. Each transformer unit comprises at least one transformer, and each transformer comprises a magnetic core, a primary winding, and a secondary winding. Primary windings of the transformers in the transformer module are electrically coupled in parallel to the power source, secondary windings of the transformers of each transformer unit comprise a pair of output terminal, and N is equal to or greater than two. The voltage-multiplier module comprises the number N of multipliers, each multiplier module comprises a positive and a negative input terminal, and a positive and a negative output terminal. Positive and negative terminals of each multiplier are electrically coupled to the positive and negative output terminals of a corresponding transformer unit, and positive and negative output terminals of the multipliers are connected in series.

DRAWINGS

These and other features, aspects, and advantages of the present invention will become better understood when the following detailed description is read with reference to the accompanying drawings in which like characters represent like parts throughout the drawings, wherein:

FIGS. 5 and 6 are exemplary cross-sectional views of a power generation package according to one embodiment of the invention, respectively before and after a bottom and a top mounting board are assembled.

DETAILED DESCRIPTION

Figure 1:
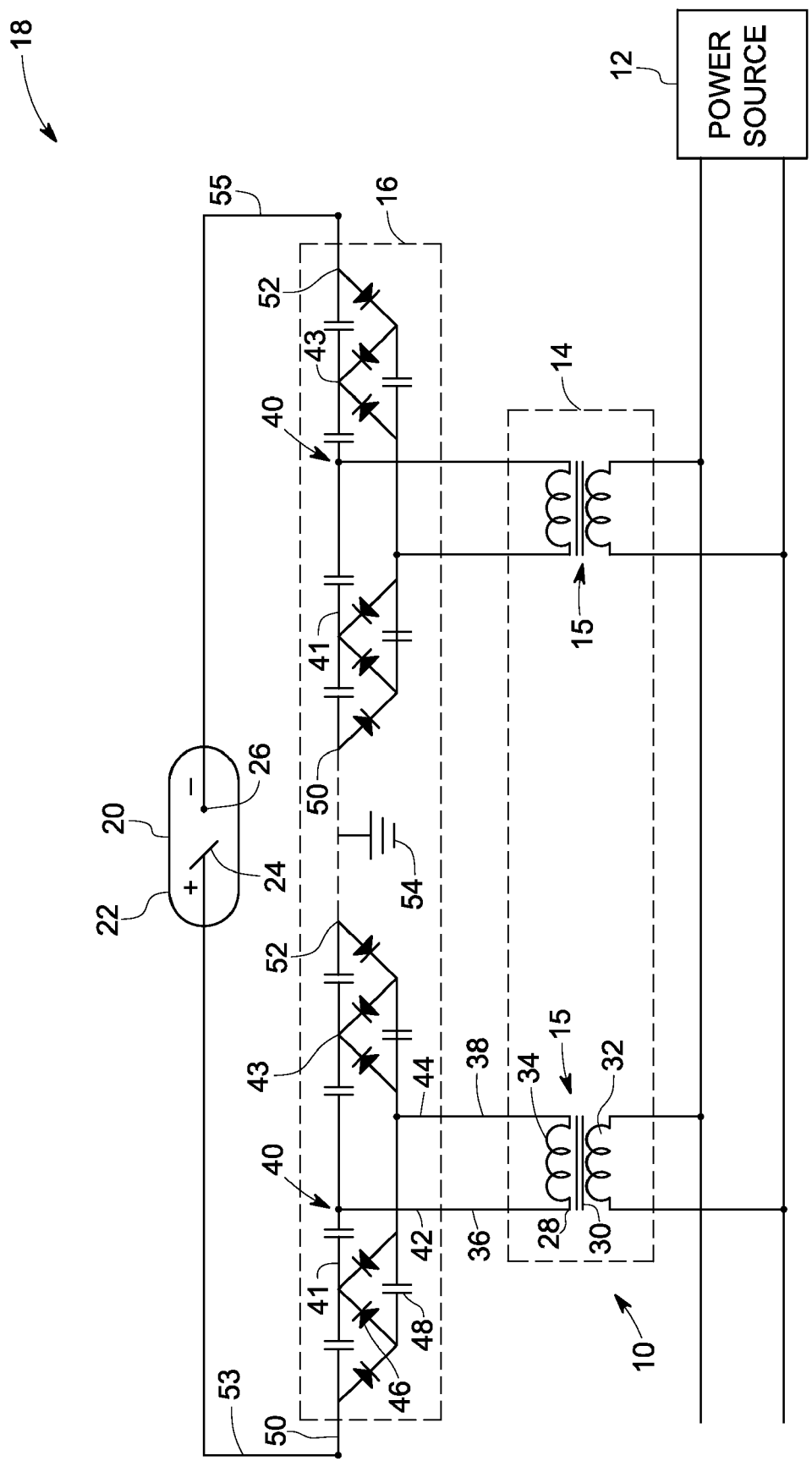
FIG. 1 is an exemplary equivalent circuit of a high-voltage power generation system for powering an X-ray tube according to one embodiment of the invention.

Embodiments disclosed herein relate to a high-voltage power generation system having a transformer module and a voltage-multiplier module for converting a low-voltage alternating current (AC) to a high-voltage direct current (DC). The transformer module comprises a number N of transformer units, and each transformer unit comprises at least one transformer, wherein N is an integer which is equal to or greater than two. The voltage-multiplier module comprises the number N of multipliers, and each multiplier comprises a positive and a negative multiplier part. Outputs of each transformer unit are electrically coupled to the positive and negative multiplier parts of the corresponding multiplier. Accordingly, a high-voltage output of the transformer module is achieved by the multiple transformers in the transformer module, and each transformer has a minimized AC stress. Further, the power generation system can thus have a high operating frequency. Embodiments of the invention are discussed below with reference to the drawing figures. For purposes of simplicity of description, common elements across different embodiments share the same reference numbers.

Referring to FIG. 1, an exemplary high-voltage power generation system 10 ("the system 10") according to one embodiment of the invention comprises a power source 12 providing a low voltage alternating current (AC), a transformer module 14 electrically coupled to the power source 12 for transforming the low voltage AC to a higher voltage AC, and a voltage-multiplier module 16 electrically coupled to the transformer module 14 for further boosting the AC from the transformer module 14 to an even higher voltage AC as well as converting the high-voltage AC into a targeted high-voltage direct current (DC).

In the illustrated embodiment of FIG. 1, the system 10 is used in an X-ray generator 18 for providing the targeted high-voltage DC to an X-ray tube 20. The X-ray tube 20 comprises a vacuum tube 22, an anode 24 and a cathode 26 electrically coupled to the voltage-multiplier module 16 of the system 10. The high voltage from the system 10 pushes electrons to flow from the cathode 26 to the anode 24 to induce X-ray emission. In certain embodiments, the targeted high-voltage DC applied on the anode and cathode 24, 26 is ranging from 40 kV to 160 kV for medical application, and an X-ray intensity is between 20 mA to 1 A.

With continued reference to FIG. 1, the power source 12 is an alternating current (AC) power source that can provide a low voltage AC signal to the transformer module 14. In another embodiment, which is not shown, the power source 12 may comprise a DC power source and an inverter converting a low voltage DC from the DC power source to a low voltage AC. In certain embodiments, the power source 12 may further comprise a filtering circuit (not shown) between the power source and the transformer module 14. In one embodiment, a voltage amplitude of the low voltage AC of the power source 12 may be about a few hundred volt. In one embodiment, a frequency of the low voltage AC of the power source 12 may range from several tens KHz to a few mHz.

In certain embodiments of the invention, the transformer module 14 comprises at least two transformer units 15, and each transformer unit 15 comprises at least one transformer 28. In the illustrated embodiment of FIG. 1, each transformer unit 15 comprises only one transformer 28, which comprises a magnetic core 30, a primary winding 32 and a secondary winding 34. Primary windings 32 of the transformers 28 in the at least two transformer units 15 are connected in parallel to the power source 12. In one embodiment, a secondary-to-primary turns ratio of each transformer 28 ranges between 4:1 to 12:1. In one specific embodiment, a secondary-to-primary turns ratio of each transformer ranges between 6:1 to 10:1. Accordingly, each transformer 28 converts the lower voltage AC from the power source 12 into a higher voltage AC and outputs the higher voltage AC through a pair of output terminals 36 and 38 of the secondary windings 34. In one embodiment, each of the transformers 28 include the same secondary-to-primary turns ratio, and accordingly output substantially the same AC voltage through the pair of output terminals 36, 38 of the secondary windings 34.

In certain embodiments, the voltage-multiplier module 16 comprises the same number of multipliers 40 as the transformer units 15 in the transformer module 14. In the illustrated embodiment of FIG. 1, the voltage-multiplier module 16 comprises two multipliers 40. Each multiplier 40 is a bipolar multiplier and comprises a positive multiplier part 41 and a negative multiplier part 43. The positive and negative multiplier parts 41, 43 comprise a positive and a negative input terminals 42, 44 electrically coupled to the corresponding transformer unit 15 through the pair of output terminals 36, 38. The positive and negative multiplier parts 41, 43 are each a unidirectional multiplier circuit comprising a plurality of diodes 46 and capacitors 48, and respectively rectify and amplify the high AC voltage output of the corresponding transformer 28 into a high-voltage positive DC at a positive DC output 50 and a high-voltage negative DC at a negative DC output 52. Output terminals 50, 52 of adjacent multipliers 40 are connected in series, and thus, a total output of the voltage-multiplier module 16 can be represented as a sum of the output voltages of the two multipliers 40 of the voltage-multiplier module 16.

In certain embodiments, the at least two multipliers 40 have the same voltage input from the transformer module 14 and the same magnification factors, and accordingly have the same DC output. In one embodiment, a magnification factor of each multiplier 40 may range from 3 to 12. In the illustrated embodiment, the two multipliers 40 in the voltage-multiplier module 16 comprise a neutral point 54 connected to Ground. Accordingly, the voltage potentials at the positive and negative output terminals 53, 55 of the voltage-multiplier module 16 have substantially the same voltage magnitudes and reversed polarities. For example, if a targeted high-voltage DC applied to the X-ray tube is 150 kV, then the voltage potentials at the positive and negative output terminals 50, 52 are +75 kV and −75 kV, respectively.

Figure 2:
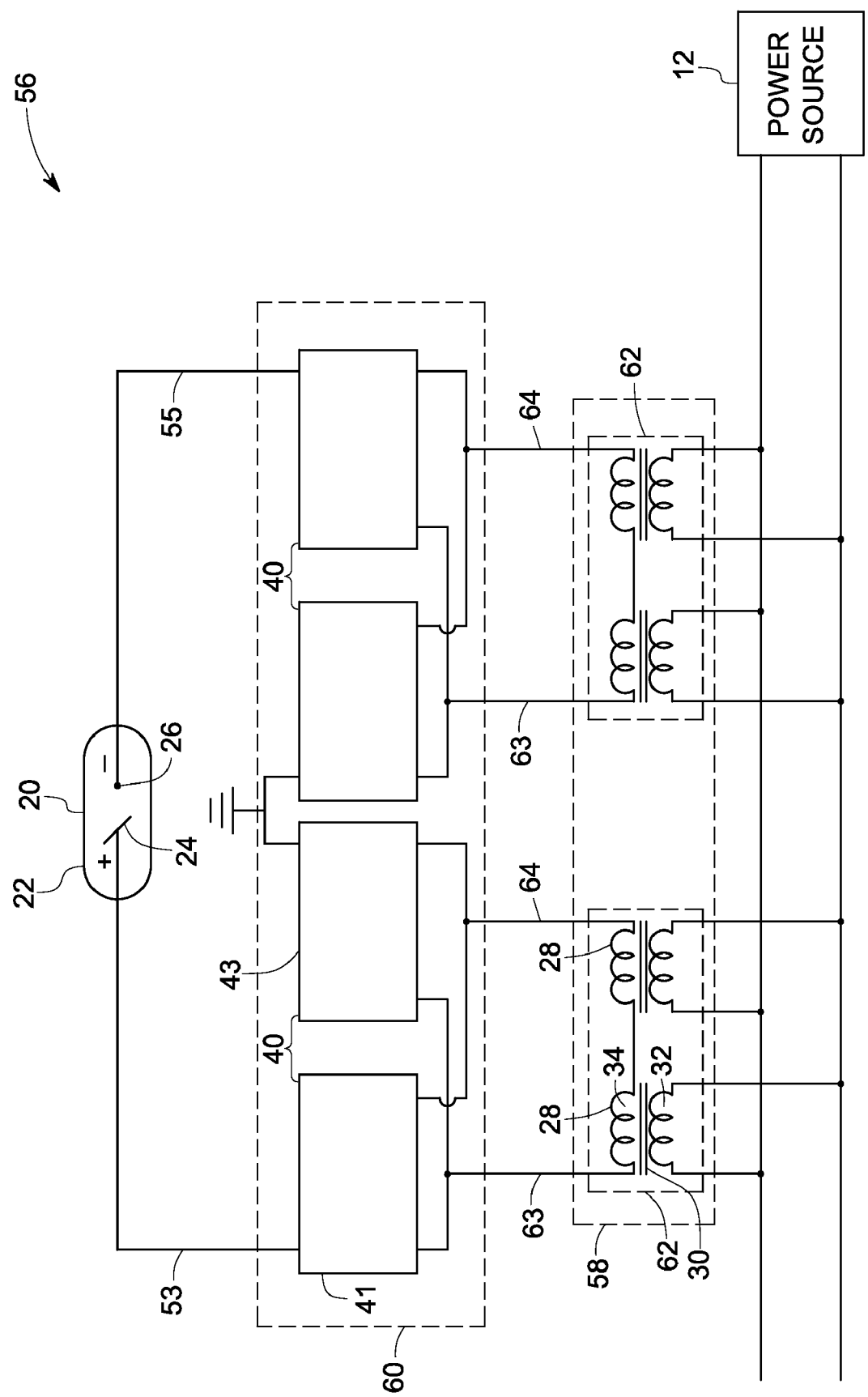
FIG. 2 is an exemplary circuit diagram of a high-voltage power generation system according to another embodiment of the invention.

Referring to FIG. 2, a high-voltage power generation system 56 according to another embodiment of the invention comprises the power source 12, a transformer module 58, and a voltage-multiplier module 60. In the illustrated embodiment of FIG. 2, the voltage-multiplier module 60 comprises two multipliers 40. In the illustrated embodiment of FIG. 2, each multiplier 40 comprises a similar configuration as the multiplier 40 described above with reference to FIG. 1, and the positive and negative multiplier parts 41, 43 are each illustrated as a block.

In certain embodiments, the transformer module 58 comprises at least two transformer units 62, and each transformer unit 62 comprises at least one transformer. In the illustrated embodiment of FIG. 2, the transformer module 58 comprises two transformer units 62, and each transformer unit 62 comprises two transformers 28. Each transformer 28 has a similar configuration to that described with reference to FIG. 1. Primary windings 32 of the transformers 28 in the transformer module 58 are connected in parallel to the power source 12 and secondary windings 34 within the same transformer unit 62 are connected in series. Each transformer unit 62 comprises a pair of output terminal 63, 64 electrically coupled to the voltage-multiplier module 60. Accordingly, a total output of the transformer unit 62 is a sum of the outputs of the two transformers 28 within the same transformer unit 62.

The embodiments illustrated in FIGS. 1 and 2 are provided as examples and are not meant to limit the invention. In other embodiments, the transformer module may comprise more than two transformer units, and the voltage-multiplier module comprises more than two voltage-multiplier modules. Each transformer unit has a secondary winding electrically coupled to a corresponding bipolar multiplier module. In certain embodiments, each of the transformer units comprises the same number of transformers. For example, each transformer unit may comprise three transformers. In other embodiments, the transformer units may comprise different number of transformers.

Figure 4:
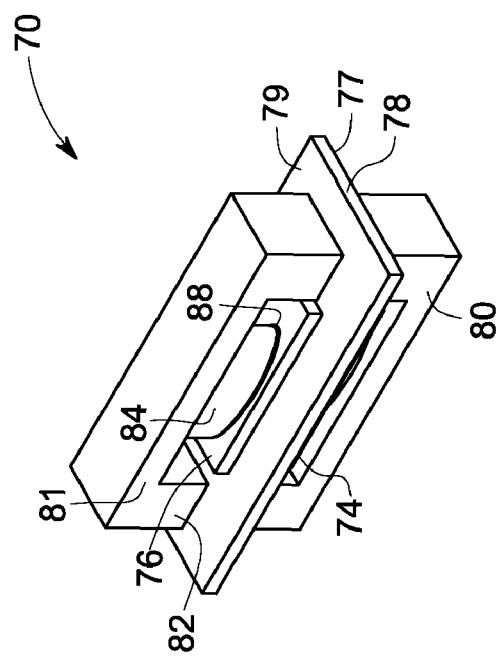
FIG. 4 is a perspective view of the transformer package of FIG. 3.
Figure 3:
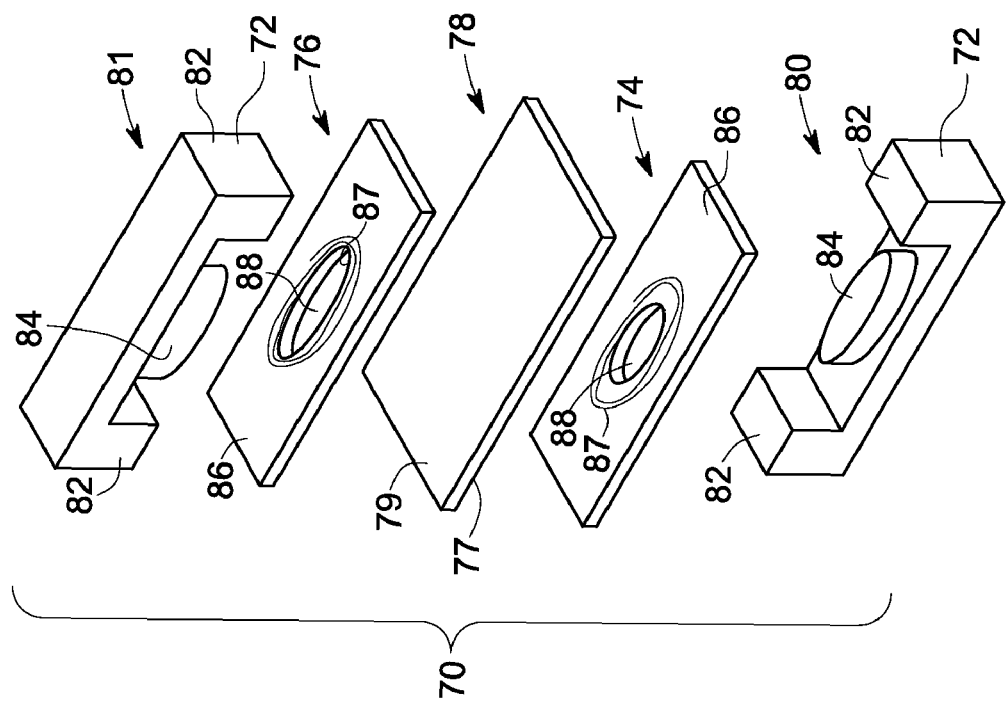
FIG. 3 is an exemplary exploded view of a transformer package according to one embodiment of the invention.

FIGS. 3 and 4 illustrate an exemplary transformer package 70 for carrying, for example, a transformer 28 as described with respect to FIGS. 1 and 2. Referring to FIG. 3, the illustrated transformer package 70 comprises a magnetic core 72 having a lower core part 80 and an upper core part 81, a primary winding 74, a secondary winding 76, and an insulation planar board 78 between the primary and secondary windings 74, 76. In the illustrated embodiment, the primary winding 74 and the secondary winding 76 are respectively wound around the lower core part 80 and the upper core part 81. The insulation planar board 78 comprises a bottom planar surface 77 and a top planar surface 79. The lower and upper core parts 80, 81 are respectively mounted to the bottom and top surfaces 77, 79 of the insulation planar board 76 to form a close-loop magnetic path. The insulation planar board 76 forms an insulation gap in the magnetic path and insulates the high voltage between the primary and secondary windings 74, 76. In one embodiment, the insulation planar board 76 may comprise polypropylene (PP).

In the illustrated embodiment, each of the lower and upper core parts 80, 81 is a planar E-shaped magnetic core ("E-core") comprising a pair of arms 82 and a center leg 84. In one embodiment, each of the lower and upper core parts 80, 81 is an ER-core and comprises a cylindrical center leg 84. The primary and secondary windings 74, 76 are respectively wound on the center legs 84 of the lower and upper E-cores, or wound on one of the arms 82. In other embodiments, the lower and upper core parts 80, 81 may comprise configurations other than an E-core. For example, the lower and upper core parts 80, 81 may each be a half-ring-shaped core (C-core or U-core), one of the lower and upper core parts 80, 81 may be a half-ring-shaped core and the other an I-shaped core, or one of the lower and upper core parts 80, 81 may be an E-core and the other an I-shaped core.

In the illustrated embodiment of FIG. 3, the primary and secondary windings 74, 76 each comprise an electrical circuit 87 carried on a printed circuit board (PCB) 86. In the illustrated embodiment, the PCBs 86 each comprise a through hole 88 and the electrical circuits 87 are configured a planar spiral or coiled shape around the through hole 88. The center legs 84 of the pair of E-core 80, 81 extend through the through holes 88 of the corresponding PCB 86, and thus the electrical circuits 87 are wound on the center legs 84 to form the primary and secondary windings 74, 76. In other embodiments, each of the primary and secondary windings 74, 76 may comprise a coil wound around the center legs 84 or arms 82 of the two E-cores 80, 81.

Figure 7:
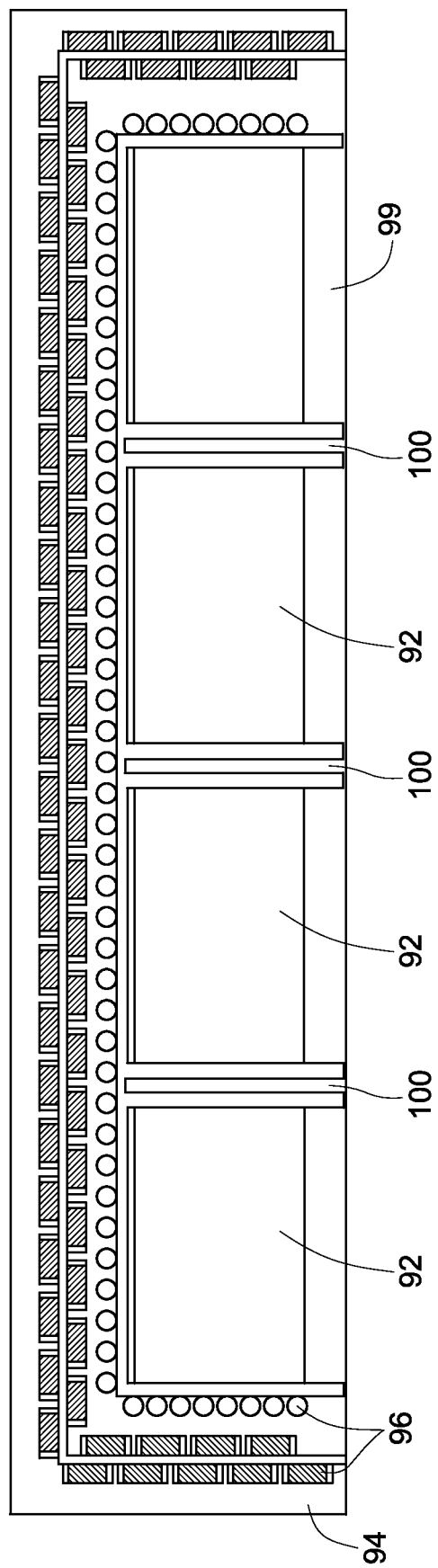
FIG. 7 is a top view of the power generation package of FIGS. 5 and 6 without the bottom and top mounting boards.

FIGS. 5, 6 and 7 illustrate a power generation package 90 for carrying, for example, a power generation system such as the power generation systems 10, 56 previously described with reference to FIGS. 1 and 2. Referring to FIG. 5, in the illustrated embodiment, the power generation package 90 comprises at least two transformer packages 92, a PCB 94 and a plurality of electronic elements 96 mounted on the PCB 94 to form a voltage-multiplier circuit. In the illustrated embodiment, the power generation package 90 comprises four transformer packages 92 and the four transformer packages 92 comprise one common insulation planar board 98. Referring to FIG. 6, similar to the transformer package 70 discussed with respect to FIG. 3, each transformer package 92 comprises lower and upper magnetic core parts 80, 81 mounted on bottom and top surfaces 97, 99 of the insulation planar board 98, as well as primary and secondary windings 74, 76 wound on the lower and upper magnetic core parts 80, 81. Accordingly, the transformer packages 92 are in a planar configuration, and have a large heat dissipation area.

In the illustrated embodiment of FIGS. 5, 6 and 7, the PCB 94 comprises an integral part of the insulation planar board 98 with electrical traces (not shown). In one embodiment, the electronic elements 96 comprise capacitors and diodes mounted on the same surface of the insulation planar board 98 that the secondary windings 76 are mounted. The electronic elements 96 are electrically coupled to the secondary windings 76 of the transformer packages 92 through conductors (not shown) or through electrical traces on the PCB 94. In other embodiments, the PCB 94 may comprise a separate member (not shown) with respect to the insulation planar board 98, and is mounted to the insulation planar board 98 by adhesive.

In the illustrated embodiment of FIGS. 5 and 6, the power generation package 90 further comprises a bottom and a top mounting board 102, 104 (FIGS. 5 and 6). During assembling of the power generation package 90, after the transformer packages 92 and electronic devices 96 are all mounted to the PCB 94, the bottom and top mounting boards 102, 104 are secured to each other to securing the insulation planar board 98 and transformer package 92 therebetween. The bottom and top mounting boards 102, 104 are attached with each other by, for example, bolts 106 and nuts 108 (FIG. 6) to complete the power generation package 90.

Referring to FIG. 7, in the illustrated embodiment, the power generation package 90 further comprises a plurality of ribs 100 on the insulation planar board 98 and between adjacent secondary windings 76 of two adjacent transformers packages 92 for electrical insulation purposes.

Figure 8:
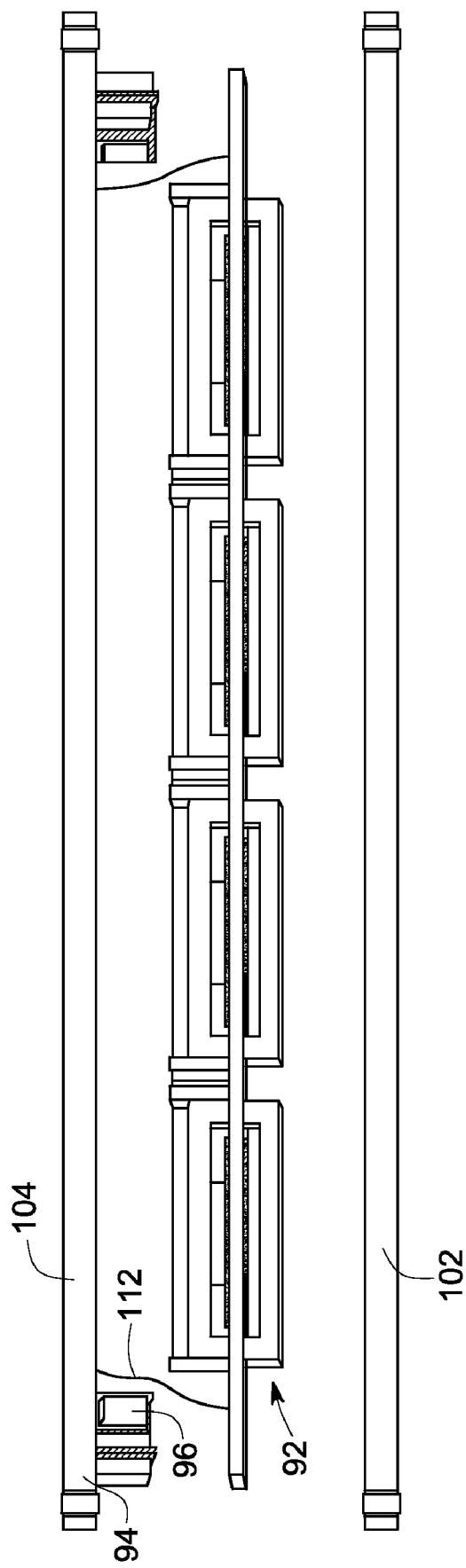
FIG. 8 is an illustrative cross-sectional view of the power generation package according to another embodiment of the invention, before the bottom and a top mounting boards are assembled.

FIG. 8 shows a power generation package 110 before the bottom and top mounting boards 102, 104 are assembled according to another embodiment of the invention. In the illustrated embodiment, the PCB 94 comprise a discrete member attached to a lower surface of the top mounting board 104 adjacent to the secondary windings of the transformer package 92. Secondary windings of the transformer package 92 may be electrically coupled to the electronic elements 96 on the PCB 94 through wires or conductors 112.

Although the embodiments above are discussed to be used in an X-ray generator, the power generation system and package can also be used to provide high voltage to electronic devices or machines including medical instruments such as mammography systems, mobile computer tomographies (CTs) or multi-source CTs, or security equipment such as luggage pre-scan machine, or Non-Destructive Testing (NDT) equipment for maintenance of aircraft engines, water treatments industry, and oil and gas transmission equipments.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

The invention claimed is:

1. A power generation system comprising:
   a power source;
   a transformer module for converting a low voltage from the power source into a higher voltage, the transformer module comprising a number N of transformer units, each transformer unit comprising at least one transformer, and each transformer comprising a magnetic core, a primary winding, and a secondary winding,
   wherein primary windings of the transformers in the transformer module are electrically coupled in parallel to the power source, secondary windings of the transformers of each transformer unit comprise a pair of output terminals, and N is equal to or greater than two; and
   a voltage-multiplier module for amplifying higher voltage from the transformer module, the voltage-multiplier module comprising the number N of multipliers, each multiplier comprising a positive and a negative output terminal, each multiplier comprising a positive multiplier part and a negative multiplier part, the positive and negative multiplier parts each comprising a positive and a negative input terminal,
   wherein positive and negative input terminals of the positive and negative multiplier parts of each multiplier are electrically coupled to the positive and negative output terminals of a corresponding transformer unit in parallel, and positive and negative output terminals of the multipliers are connected in series.

2. The system of claim 1, wherein the voltage-multiplier module comprises a neutral point connected to ground.

3. The system of claim 1, wherein each multiplier comprises a magnification factor ranging from 3 to 12.

4. The system of claim 1, wherein each transformer unit comprises at least two transformers, and secondary windings of the at least two transformers in the same transformer unit are connected in series.

5. The system of claim 1, wherein the transformer module comprises two transformer units, and the voltage-multiplier module comprises two multipliers.

6. The system of claim 5, wherein each transformer unit comprises two transformers, secondary windings of the two transformers are connected in series and electrically coupled to the two multipliers respectively.

7. The system of claim 1, wherein a secondary-to-primary turns ratio of each transformer ranges from 4:1 to 12:1.

8. The system of claim 7, wherein the secondary-to-primary turns ratio of each transformer ranges from 6:1 to 10:1.

9. An X-ray generation system comprising:
   a power source providing a low-voltage alternating current;
   a transformer module for converter the low-voltage alternating current from the power source into a higher-voltage alternating current, the transformer module comprising a number N of transformer units, each transformer unit comprising at least one transformer, and each transformer comprising a magnetic core, a primary winding, and a secondary winding,
   wherein primary windings of the transformers in the transformer module are electrically coupled in parallel to the power source, secondary windings of the transformers of one transformer unit comprise a positive and a negative output terminal, and N is equal or greater than two;
   a voltage-multiplier module for converting the higher-voltage alternating current from the transformer module into a high-voltage direct current, the voltage-multiplier module comprising the number N of multipliers, each multiplier comprising a positive and a negative output terminal, each multiplier comprising a positive multiplier part and a negative multiplier part, the positive and negative multiplier parts each comprising a positive and a negative input terminal,
   wherein positive and negative input terminals of the positive and negative multiplier parts of each multiplier are electrically coupled to the positive and negative output terminals of a corresponding transformer unit in parallel, and positive and negative output terminals of the multipliers are connected in series; and
   a X-ray tube having an anode and a cathode respectively electrically coupled to the positive and negative output terminals of the voltage-multiplier module.

10. A power generation package comprising:
    at least two transformer packages comprising one insulation planar board, the insulation planar board comprising bottom and top surfaces, and each transformer package comprising:
    a magnetic core comprising a lower core part and an upper core part respectively attached to the bottom and top surfaces of the insulation planar board; and
    a primary winding wound on the lower core part and a secondary winding wound on the upper core part;
    a printed circuit board carrying a plurality of electronic elements electrically coupled to the secondary windings of the at least two transformer packages; and
    a top mounting board and a bottom mounting board secured to each other.

11. The package of claim 10, wherein the printed circuit board comprises an integral part of the insulation planar board.

12. The package of claim 10, wherein at least one of the lower and upper core parts is an E-shaped core part comprising a pair of arms and a center leg.

13. The package of claim 12, wherein at least one of the first and secondary windings comprises an electrical circuit carried on a printed circuit board.

14. The package of claim 13, wherein the printed circuit board comprises a through hole, and the electrical circuits are configured as a planar spiral or coiled shape around the through hole.

15. The package of claim 10, wherein the lower core part is electrically coupled to ground on the printed circuit board.

16. The package of claim 10, wherein the insulation planar board comprises polypropylene.

17. The package of claim 10, wherein the printed circuit board comprises an integral portion of one of the top and bottom mounting board which is closer to secondary windings of the transformer packages.

18. The package of claim 17, wherein the electronic elements on the printed circuit board are electrically coupled to the secondary windings of the transformer packages through electrical wires or conductors.

* * * * *